April 25, 1961    G. B. HAYES    2,981,303
TRACTION ATTACHMENT FOR AN AUTOMOBILE WHEEL
Filed Jan. 15, 1960
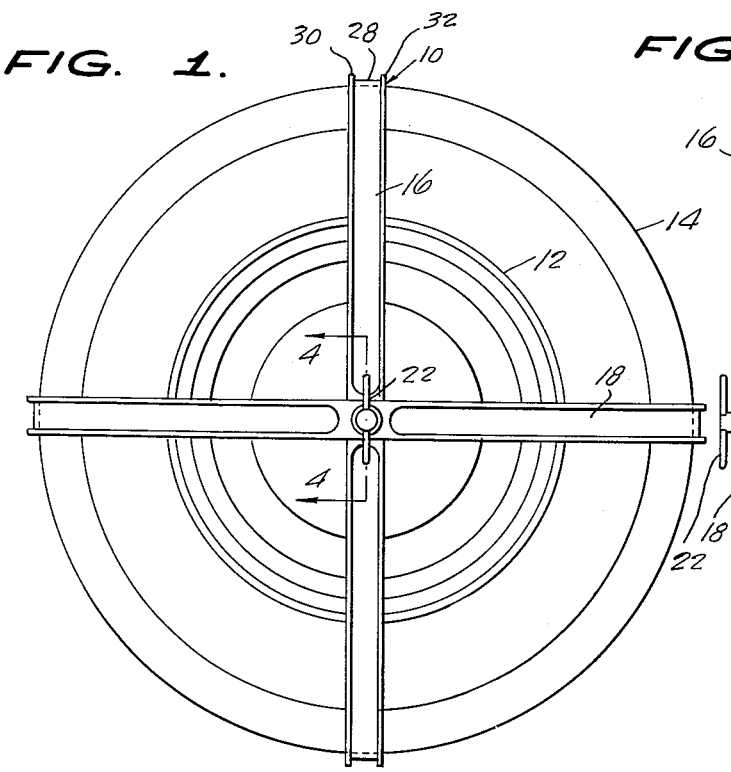
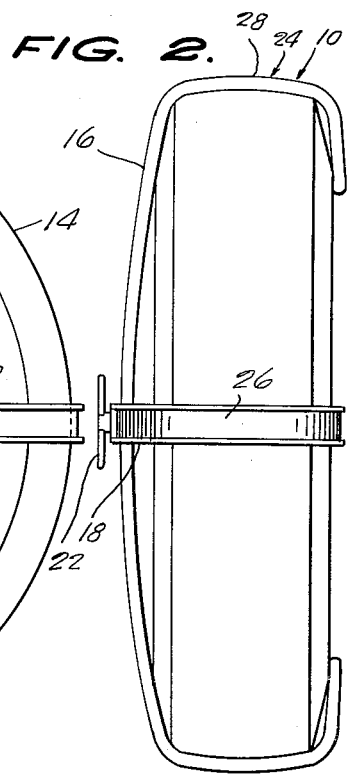
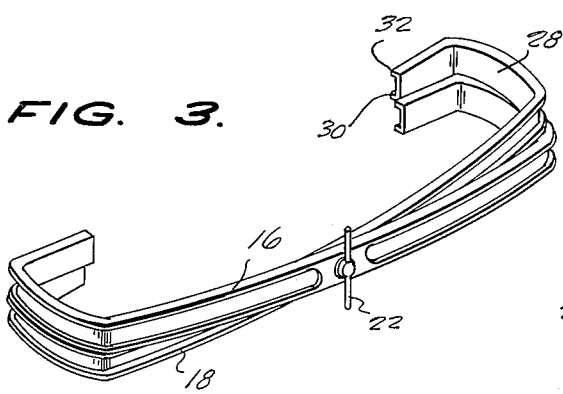
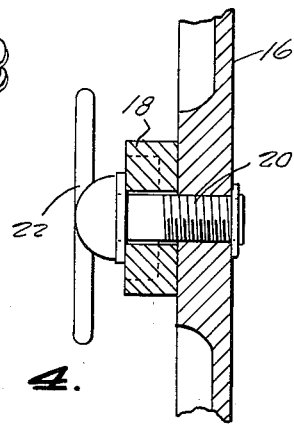
INVENTOR.
GRANT B. HAYES,
BY
McMorrow, Berman & Davidson
ATTORNEYS.

United States Patent Office 2,981,303
Patented Apr. 25, 1961

2,981,303

TRACTION ATTACHMENT FOR AN AUTOMOBILE WHEEL

Grant Bernard Hayes, 202 W. Main St., La Crosse, Ind.

Filed Jan. 15, 1960, Ser. No. 2,771

3 Claims. (Cl. 152—228)

The present invention relates to vehicles generally and in particular to a traction device for an automobile wheel for use in mud or snow.

Automobiles presently in use are provided with tires having relatively smooth surfaces in order that there be a minimum amount of road noise with an optimum amount of traction for ordinary driving conditions. Such tires are of little use when the vehicle is driven over muddy or snowy surfaces and numerous devices have been proposed for increasing the traction of the wheels in mud and snow. Most of the devices proposed or in use consist in lengths of chains which are attached to the automobile wheels with various means, such chains requiring rolling of the automobile wheel over a portion of the chain and bringing the balance of the chain around the wheel and fastening the same. The attachment of such a chain is accomplished only by mean and tedious labor and for that and other reasons, the chains in use or proposed are not wholly satisfactory to the traveling public.

An object of the present invention is to provide a traction device or attachment for an automobile wheel which lends itself to ready attachment to and detachment from the wheel of an automobile without the necessity of rolling the wheel forwardly or backwardly.

Another object of the present invention is to provide a traction attachment for an automobile wheel which can be conveniently installed on the tires of a vehicle without jacking up of the vehicle to raise the wheels or tires off the road.

A further object of the present invention is to provide a traction attachment for an automobile wheel which is sturdy in construction, one simple in structure requiring no special tools to apply the same to an automobile wheel, one which is compact when in a condition for storing, and one which highly effective in action.

These and other objects and advantages of the present invention will be fully apparent from the following description when taken in conjunction with the annexed drawing, in which:

Figure 1 is an elevational view of an automobile wheel with the attachment of the present invention installed thereon.

Figure 2 is an elevational view of the wheel as seen from the front or back with the attachment of the present invention installed thereon.

Figure 3 is an isometric view of the attachment in nested or folded condition.

Figure 4 is a view on an enlarged scale, taken on the line 4—4 of Figure 1.

Referring in greater detail to the drawing in which like numerals indicate like parts throughout the several views, the traction attachment according to the present invention is designated generally by the reference numeral 10 and is shown in Figures 1 and 2 mounted upon an automobile wheel and tire, the wheel being designated by the numeral 12 and the tire by the numeral 14.

The attachment 10 comprises two elongated bar members 16 and 18 arranged in a criss-cross relation position, as in Figures 1 and 2. Means, embodying a stud bolt 20, connects the bar members 16 and 18 at the criss-cross point for movement from the criss-cross position to a position in which the bar members 16 and 18 are in abutting relation, or in a nested or folded position as in Figure 3.

Means is provided releasably securing the bar members 16 and 18 in the criss-cross or abutting positions. This means consists in a thumb nut 22 threadably mounted on the bolt 20 and tightened thereon when it is desired to hold the bar members 16 and 18 in the criss-cross or in the abutting position.

The opposed ends of each of the bar members 16 and 18 is provided with a portion, as at 24 and 26, respectively, conformably shaped to extend about and embrace the tread and adjacent side portions of the automobile tire.

Each of the portions 24 and 26, has the part, as at 28 with reference to the portion 24 in Figure 2, extending over the tread of the wheel and provided with traction means which are of channel construction with the flanges 30 and 32 thereof facing outwardly.

In use, the attachment 10 is stored in the nested or folded condition shown in Figure 3 and is slipped over the tire 14 in that position and then the one bar member 16 is moved from the abutting position to the criss-cross relation position with respect to the other bar member 18 with the part 28 of each bar members 16 and 18 engaging the tread of the tire 14.

With the bar members 16 and 18 in the criss-cross position and the parts 28 gripping the periphery of the tire, the nut 22 is tightened down on the bolt 20 to secure the bar members 16 and 18 in this position.

Upon rotation of the wheel in ice or snow the flanges 30 and 32 of the bar members 16 and 18 will dig into the ice or snow and give added traction to the wheel of the automobile.

The attachment 10 is readily removed from the wheel by loosening of the nut 22 and swinging of the bar members 16 or 18 to the abutting position and then lifting of the tool off of the tire 14.

What is claimed is:

1. A traction attachment for automobile wheels comprising two elongated bar members of the same size arranged so that they criss-cross each other at the midportions, means embodying a pivot bolt extending through the criss-cross point connecting the bar members for movement from the criss-cross position to a position in which the bar members are in abutting position, and means embodying a thumb nut on said bolt releasably securing said bar members in the criss-cross or abutting positions, the opposed ends of each of said bar members being provided with a portion conformably shaped to extend about and embrace the tread and adjacent side portions of an automobile wheel, each of said portions having the part extending over the tread of said wheel provided with traction means.

2. A traction attachment for automobile wheels comprising two elongated bar members of the same size arranged so that they criss-cross each other at the mid-portions, means embodying a pivot bolt extending through the criss-cross point connecting the bar members for movement from the criss-cross position to a position in which the bar members are in abutting position, and means embodying a thumb nut on said bolt releasably securing said bar members in the criss-cross or abutting positions, the opposed ends of each of said bar members being provided with a portion conformably shaped to extend about and embrace the tread and adjacent side portions of an automobile wheel, each of said portions having the part extending over the tread of said wheel provided with traction means of channel construction with the flanges facing outwardly.

3. A traction attachment for automobile wheels comprising two elongated bar members of the same size arranged so that they criss-cross each other at the midportions, means connecting the bar members for movement from the criss-cross position to a position in which the bar members are in abutting position, means releasably securing said bar members in the criss-cross or abutting positions, the opposed ends of each of said bar members being provided with a portion conformably shaped to extend about and embrace the tread and adjacent side portions of an automobile wheel, each of said portions having the part extending over the tread of said wheel provided with traction means.

References Cited in the file of this patent
UNITED STATES PATENTS

| | | |
|---|---|---|
| 2,576,868 | Wolf | Nov. 27, 1951 |
| 2,806,503 | Hamerski | Sept. 17, 1957 |
| 2,912,036 | Minutilla | Nov. 10, 1959 |